United States Patent
Kadowaki et al.

(10) Patent No.: US 6,620,507 B2
(45) Date of Patent: Sep. 16, 2003

(54) FIBER-REINFORCED THERMOPLASTIC RESIN PELLETS AND MANUFACTURING METHOD THEREOF

(75) Inventors: Ryosaku Kadowaki, Kobe (JP); Yasuo Hirano, Kobe (JP); Toshihiro Asai, Kobe (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 120 days.

(21) Appl. No.: 09/804,240

(22) Filed: Mar. 13, 2001

(65) Prior Publication Data

US 2001/0033928 A1 Oct. 25, 2001

(30) Foreign Application Priority Data

Mar. 14, 2000 (JP) .......................................... 2000-070875

(51) Int. Cl.[7] .................................................. D02G 3/04
(52) U.S. Cl. ..................... 428/374; 428/378; 427/434.6; 264/143; 264/171.24
(58) Field of Search ................................. 427/359, 370, 427/434.2, 434.6, 289; 264/118, 136, 211.21, 141, 148, 143, 328.18, 171.24, 172.11; 428/374, 378

(56) References Cited

U.S. PATENT DOCUMENTS 3,403,069 A    9/1968   Benson et al.
4,549,920 A  * 10/1985  Cogswell et al. ........... 156/181
5,595,696 A  *  1/1997  Schlarb et al. .............. 264/118

FOREIGN PATENT DOCUMENTS

DE   197 11 247   12/1997
EP   0 822 056     2/1998

OTHER PUBLICATIONS

U.S. patent application Ser. No. 09/353,137, filed Jul. 14, 1999.

U.S. patent application Ser. No. 09/804,240, filed Mar. 13, 2001.

* cited by examiner

Primary Examiner—Robert D. Harlan
(74) Attorney, Agent, or Firm—Oblon, Spivak, McClelland, Maier & Neustadt, PC

(57) ABSTRACT

Disclosed is fiber-reinforced thermoplastic resin pellets that satisfy the quality stability (homogeneous impregnation, deterioration prevention of reinforcing fiber) of the molding material and the strength performance of the molded product, using natural discontinuous fiber as the reinforcing fiber, and a manufacturing method of the pellets. A plurality of spun yarns with No. 5 to 80 counts are twisted 10 to 200 turns/m and pultruded when fiber-reinforced thermoplastic pellets containing natural fiber as the reinforcing fiber are manufactured by the impregnating pultrusion method.

22 Claims, No Drawings

FIBER-REINFORCED THERMOPLASTIC RESIN PELLETS AND MANUFACTURING METHOD THEREOF

BACKGROUND OF THE INVENTION

1. Field of the Invention

The present invention relates to fiber-reinforced thermoplastic resin pellets that use natural discontinuous fiber as reinforcing fiber and a manufacturing method thereof. Furthermore, the present invention relates to the automobile parts manufactured using the pellets.

2. Description of the Related Art

Recently, fiber-reinforced resin in which vegetable fibers such as wood pulp, hemp, and hemp palm are used as reinforcing fiber has been actively developed. Nowadays, awareness of waste pollution has been increasing. The reason for this will be described hereinafter. Natural fiber does not cause waste pollution even if it is used for land filling as it is an environment-friendly material. In addition, when natural fiber is burnt, it generates a great deal of combustion energy allowing high energy recovery without causing secondary pollution such as residual ash or flue gas pollution.

However, natural fiber is a discontinuous fiber differing from continuous fibers such as glass fiber, carbon fiber, metal fiber, and various synthetic fibers that have conventionally been used as reinforcing fibers for fiber reinforced-resin. Therefore, a special technique is required to manufacture molding resin pellets mixed with natural fiber that exhibit the characteristics of long fiber. For example, a continuous fiber strand is impregnated in a molten resin bath continuously and pultruded, and cooled to solidify the resin and then cut into pellets of an arbitrary length. This method is widely used to manufacture fiber-reinforced resin pellets continuously with high productivity. However, even if discontinuous natural fibers are twisted into yarns, the strength of the spun yarns is insufficient to be processed in a molten resin bath, discontinuous fiber spun yarns are often broken due to the release of discontinuous fiber in the resin bath when the spun yarns are impregnated and pultruded in the molten resin bath. This makes it difficult to continue stable operation.

For example, methods for manufacturing fiber-reinforced resin pellets using discontinuous natural fiber as a reinforcing fiber described are proposed hereinafter, but the methods have both merits and demerits.

(1) A method in which natural fiber is kneaded to mix it homogeneously in molten thermoplastic resin using a roll kneader and then the mixture is cooled to solidify, and the product is crushed to form resin pellets (J-P-A No. 108161/1982). By applying this method, molding material in which discontinuous fiber is dispersed homogeneously in matrix resin is obtained. However, the molding material has disadvantages in that the handling process, including the molding process, is difficult and quality stability of the molded product is poor due to irregularity in the size of the resin pellet.

(2) A method in which discontinuous fiber is spun to form spun yarn, spun yarn is processed to form fabrics or wovens, nonwovens, or mats, the processed product is impregnated in a molten resin bath and then cooled to solidify, and the cooled product is cut into the product of a suitable configuration and size to form resin pellets. (J-P-A Nos. 28307/1983, 7307/1991, 30916/1991, and 41280/1997). This method is suitable for applications in which the product is used for secondary molded material such as a resin-impregnated sheet, but when the product is used in the form of a pellet, the product that has been cooled and solidified is cut into pellets of a suitable configuration and size, and the cutting process requires much working and results in a low productivity. Furthermore, the cutting process is involved in a problem of much loss, and dust generated in cutting process causes pollution of the working environment.

(3) A method in which molten resin and discontinuous fiber are kneaded using a kneader or a kneading extruder and then the molten mixture is extruded, cooled, and solidified to form a rod product, afterwards, the rod product is cut into pellets of an arbitrary length (J-P-A Nos. 146945/1987, 146947/1987, and 290453/1991). This method has disadvantages in that it is difficult to feed cotton-like fiber into a kneading extruder, and the reinforcing fiber is subjected to thermal deterioration when resin is heated for melt kneading, and reinforcing fiber is subjected to mechanical damage due to the kneading force. As a result, the reinforcing effect is poor. In particular, because heat decomposition usually begins at a temperature range of 150 to 180° C. in the case of vegetable fibers such as wood pulp and linen, thermoplastic resin that does not cause such problems must be selected for composite forming depending on the fiber type and kneading time. Therefore, the freedom in selection of matrix resin is limited. Furthermore, because such resin with a low melting point is generally not strong, the application of the fiber-reinforced resin molded product is naturally limited.

(4) A method in which composite fiber strands comprising reinforcing spun yarn and thermoplastic resin fiber is formed, and the composite fiber strand is heated to melt the thermoplastic resin fiber, it is cooled and solidified, and then the solidified product is cut into pellets of a suitable length (J-P-A No. 163002/1992). To apply this method, thermoplastic resin fiber is manufactured previously or mixed yarn containing reinforcing fiber and thermoplastic resin fiber is manufactured, the manufacturing process requires a lot of work, and this method is troublesome. Furthermore, insufficient impregnation can occur causing void defects depending on the heat melting conditions for melting the thermoplastic resin fiber.

(5) A method in which a reinforcing fiber strand is impregnated with molten thermoplastic resin, cooled and solidified, and then cut into pellets of a suitable length (for example, J-P-B Nos. 37694/1988, 57407/1994 and J-P-A Nos. 178411/1989, 119807/1992). This literature disclose a case where jute (linen fiber) can be used as a reinforcing fiber, however, they mainly disclose cases where continuous fiber is used as a reinforcing fiber. This literature does not reveal any detailed problem arising when discontinuous fiber is mixed with thermoplastic resin as a reinforcing fiber to form composite material.

The inventors of the present invention are interested in a natural discontinuous fiber that has attracted much attention as a reinforcing fiber in the above-mentioned known circumstances, and have developed a technique for manufacturing discontinuous fiber reinforced thermoplastic resin pellets that solve problems of conventional resin pellets as described hereinbefore caused in the manufacturing process of molding thermoplastic resin pellets consisting of a composite material containing reinforcing fiber in thermoplastic resin. Particularly, all the problems in the continuous manufacturing process, in quality stability (homogeneous impregnation and prevention of reinforcing fiber), and in the strength characteristic of the molded product are to be solved.

SUMMARY OF THE INVENTION

Accordingly, it is an object of the present invention to provide discontinuous fiber reinforced thermoplastic resin pellets that satisfy the conditions required for continuous production, quality stability of the molded material (homogeneous impregnation and deterioration prevention of reinforcing fiber), and the strength characteristics of the molded product.

It is a further object of the present invention to provide natural fiber-reinforced thermoplastic resin pellets comprising thermoplastic resin and strand comprising a plurality of spun yarns of natural fiber twisted in a range from 10 to 200 turns/m, wherein the spun yarn is No. 5 to 80 counts in diameter.

It is yet another object of the present invention to provide a method for manufacturing natural fiber-reinforced thermoplastic resin pellets comprising the steps of: an impregnating step for impregnating in a thermoplastic resin bath, a plurality of spun yarns of natural fiber being No. 5 to 80 counts in diameter, a pultruding step for pultruding the spun yarns with twisting 10 to 200 turns/m to obtain natural fiber-reinforced thermoplastic, and a pelletizing step for pelletizing the natural fiber-reinforced thermoplastic resin.

It is still another object of the present invention to provide natural fiber-reinforced thermoplastic resin-made automobile parts manufactured using natural fiber-reinforced thermoplastic resin pellets as the molding material.

Other objects and advantages of the present invention will become apparent from the detailed description to follow taken in conjunction with the appended claims.

DETAILED DESCRIPTION OF THE PREFERRED EMBODIMENTS

As described hereinbefore, in the present invention, molten thermoplastic resin is impregnated in discontinuous natural fiber and the impregnated fiber is pultruded, and then cut into fiber-reinforced thermoplastic resin pellets of a suitable length. In the manufacturing process, the spun yarn that is formed by twisting natural fiber properly is used wherein the yarn number count of the spun yarn is specified, a plurality of spun yarns are paralleled to form a paralleled yarn, the paralleled yarn is twisted properly and impregnated with thermoplastic resin, the impregnated yarn is pultruded and cooled and solidified, and then it is cut into fiber-reinforced resin pellets of a suitable length. By employing this method, long fiber-reinforced thermoplastic resin pellets in which discontinuous natural fiber is used as a reinforcing fiber is manufactured continuously with high productivity.

The fiber-reinforced thermoplastic resin pellets of the present invention obtained by this method are characteristic based on the feature of the manufacturing process described hereinbefore in that a plurality of discontinuous fiber spun yarns that have been twisted properly is embedded in thermoplastic resin.

Examples of natural fiber used in the present invention include flax, ramie, abaca, sisal, jute, hemp, kenaf, Boehmeria nipponivea fiber or Japanese ramie, coir, cotton, kapok, hemp palm, rice straw, wheat straw, pineapple fiber, wool, and silk. These fibers are used alone individually, or a plurality of these fibers are used in combination as required. When a plurality of natural fibers are used combinedly, blended yarn that is formed by blending fibers in a spinning process may be used or a blended strand that is formed by blending different spun yarns in a paralleling process may be used. Furthermore, it is possible to combine a plurality of types of spun yarns when thermoplastic resin is impregnated in a plurality of spun yarns (bundle) to form a composite. Furthermore, it is possible to mix a small amount of discontinuous synthetic fiber with natural fiber depending on the case.

The thickness of spun yarn to be used is preferably of a No. 5 to 80 count (spun yarn with a weight of 1 kg and a length of 29,029 m is a No. 1 count) represented by a jute yarn number count according to JIS L0101 (based on a given length), thin spun yarn is preferably used from the view point of good penetration of thermoplastic resin, and a No. 7 to 80 count, or preferably a No. 10 to 40 count is used.

If thin yarn thinner than a No. 5 count is used, the strength of the single yarn is too weak to withstand the drawing force, the yarn can be broken due to drawing tension thus causing difficulty in stable continuous manufacturing. On the other hand, If yarn thicker than a No. 80 count is used, impregnation of resin is insufficient, and when the impregnated strand is cut using a pelletizer, the fluffing caused results in a polluted working environment, or a bridging of pellets occurs due to fluff at the hopper, thus resulting in poor productivity of the molded product and insufficient mechanical properties of the molded product when the obtained resin pellet is used.

Next, the detailed manufacturing method will be described hereinafter. Natural discontinuous fiber is twisted to form a spun yarn, a plurality of spun yarns are paralleled, the paralleled yarns are passed through a molten thermoplastic resin bath where thermoplastic resin extruded from an extruder is filled. The plurality of spun yarns is twisted in the molten thermoplastic resin bath to form a strand. In the molten thermoplastic resin bath, the molten thermoplastic resin is impregnated into the spun yarn strand. The spun yarn strand impregnated with thermoplastic resin is pultruded through a nozzle and cooled, and it is cut to form fiber-reinforced thermoplastic resin pellets containing a natural discontinuous fiber of a certain length.

At that time, it is preferable to control the impregnating duration from the time when the spun yarn strand enters the molten thermoplastic resin bath to the time when it is pultruded through the nozzle to be less than 10 seconds, or preferably less than 5 second. If the impregnating duration is excessively long, the duration while the natural fiber is being subjected to heat in the molten thermoplastic resin bath is also too long, and heat deterioration of the fiber can be caused. On the other hand, if the impregnating duration is excessively short, the impregnation is not sufficient. The time is preferably equal to 0.1 seconds or longer, or better still equal to 0.15 seconds or longer.

During the process in which the spun yarn strand is impregnated in the bath, passed through the bath, and pultruded from the bath, the paralleled spun yarns are twisted with a pitch of 10 to 200 turns/m, preferably 15 to 150 turns/m, or better still 20 to 120 turns/m. The molten thermoplastic resin penetrates into the spun yarn strand due to proper twisting, and the proper twisting brings about good impregnation. Even if some spun yarns are partially loosened to result in released yarn, such yarns are twisted together with other spun yarns to form a strand. Therefore, the spun yarn strand will not be broken in the impregnating bath, and is pultruded stably to form a resin-impregnated continuous strand. The continuous manufacturing process will not suffer from stoppage problems.

Spun yarns may be Z twist yarns or S twist yarns, but usually Z twist yarns are employed. In the present invention, for example, when Z twist yarns are used, it is preferable that the paralleled Z twist yarns are S-twisted in the molten thermoplastic resin bath, because Z twist yarns are untwisted slightly during the impregnating process and the molten resin penetrates easily into the spun yarn strand. However, when spun yarns of a small yarn number count are used, because the untwisting of the spun yarn can result in insufficient strength, it is preferable that paralleled Z twist yarns are Z-twisted to secure sufficient strength. Based on the above, it is desirable that Z-twisting is employed for spun yarns with No. 5 to 20 counts to supplement the insufficient strength, and on the other hand S-twisting is employed for spun yarns with No. 21 to 80 counts to improve penetration.

The impregnated strand is cooled downstream after pultruding to solidify the impregnated thermoplastic resin, and then cut to form fiber-reinforced resin pellets containing discontinuous natural fiber of a suitable length. The fiber-reinforced resin pellets obtained as described hereinbefore contains natural fiber spun yarn and a twisted strand comprising a plurality of spun yarns in a solidified matrix thermoplastic resin because of the characteristics of the manufacturing method. Such a distribution of natural fibers in pellets is different from that of reinforcing fiber in known continuous long fiber-reinforced resin pellets and in another type of fiber-reinforced resin pellet that is formed by a method in which woven or knitted fabric formed using discontinuous fiber spun yarn is impregnated with resin and then cut to form resin pellets.

In the fiber-reinforced resin pellets of the present invention, discontinuous natural fiber is doubly twisted resultantly in the resin. Therefore, the length of natural fiber contained in a pellet is slightly longer because of the double twisting with respect to the pellet length. Therefore, it is possible to handle pellets containing longer natural fiber as a reinforcing material advantageously (usually, long pellets cause bridging at a hopper in the molding process).

If the number of twistings in the above-mentioned impregnating and drawing process is less than 10 turns/m, the improvement in tensile strength due to twisting is insufficient, short fiber is released from spun yarn and mixed in the molten resin bath to cause increased drawing resistance and break of the natural fiber spun yarn strand. On the other hand, if the number of twistings is as excessive as 200 turns/m, the penetration of resin into the spun yarn strand is insufficient and results in a poor quality of fiber-reinforced resin pellets and a poor property of the molded product.

The type of thermoplastic resin used as the matrix resin in the present invention is not limited particularly, and any thermoplastic resin can be used. For example, polyolefin resin such as polypropylene (PP), high density polyethylene (HDPE), linear low density polyethylene (LLDPE), low density polyethylene (LDPE); polyamide resin such as polyamide 4, polyamide 6, polyamide 66, polyamide 6, polyamide 10, polyamide 11, polyamide 12, and aromatic polyamide; polyester resin such as polyethylene-terephthalate (PET) and polybutylene-terephthalate (PBT); polycarbonate resin; polystyrene resin; acrylic resin; AS resin; ABS resin; PPS resin; POM resin may be used in the form of homopolymers or copolymers, or in the form of blend polymers containing two or more polymers. The thermoplastic resin to be used may be arbitrarily selected in consideration of the required property of the fiber-reinforced resin molded product to be obtained as the final product.

However, because, in the present invention in which natural fiber is used as a reinforcing fiber, natural fiber is decomposed and deteriorated thermally resulting in a damaged reinforcing function of the material when natural fiber is exposed to a high temperature during molding, it is preferable to use thermoplastic resin with a melting or softening temperature less than 220° C., more preferably less than 220° C., and further preferably less than 180° C.

Among the above-mentioned thermoplastic resins, polyolefin resin such as polypropylene (PP), high density polyethylene (HDPE), linear low density polyethylene (LLDPE), low density polyethylene (LDPE), polymer of $\alpha$-olefin such as butene-1, hexene-1, and octane-1 or a copolymer of these olefins, modified polyolefin resin modified with unsaturated carboxylic acid or derivatives thereof; ethylene-vinylacetate resin (EVA); or blend resins containing two or more polymers described hereinbefore may be used in view of the balance between the product property and cost.

Examples of the above-mentioned unsaturated carboxylic acid or derivatives thereof used for modification include acrylic acid, methacrylic acid, maleic acid, itaconic acid, fumaric acid, esters of these acids, maleic anhydride, and itaconic anhydride. Among these substances, it is preferable to use maleic anhydride and glycidyl methacrylate.

Various modified resins that are compatible with natural fibers and thermoplastic resin may be added to thermoplastic resin to improve the adhesion to the natural fiber. Effective examples of modified resin include, for example, polyolefin modified with maleic anhydride, polyolefin modified with oxazoline, and polyolefin modified with glycidyl methacrylate for polyolefin resin. The property of the molded product can be further improved by adding an adequate amount of these substances. The preferable amount of modified polyolefin resin to be added is 0.1 to 15% by weight, preferably 0.2 to 12% by weight, and more preferably 0.5 to 10% by weight.

An inorganic filler or various additives may be added to the above-mentioned thermoplastic resin depending on the application of the molded product and the required property. Examples of inorganic filler include talc, calcium carbonate, calcium hydroxide, barium sulfate, mica, calcium silicate, clay, kaolin, silica, alumina, wollastonite, magnesium carbonate, magnesium hydroxide, titanium oxide, zinc oxide, and zinc sulfide. These materials may be used solely or in combination as required.

Examples of various additives include dispersant, lubricant, flame retardant, anti-oxidant, antistatic agent, anti-light agent, ultraviolet ray absorbing agent, carbon black, crystallization accelerator (nucleating agents), plasticizer, water absorbent, pigment, and dye. These materials may be used solely or in combination.

The pellet length of the fiber-reinforced thermoplastic resin pellet in accordance with the present invention is not particularly limited, but a pellet length of 2 to 24 mm is preferably used in view of the moldability and property of the molded product. A pellet length shorter than 2 mm results in the molded product with an insufficient property because of the short fiber length of thereinforcing fiber. On the other hand, a pellet length longer than 24 mm causes bridging at a hopper during the molding process and results in a difficult molding process. In view of these merits and demerits, the pellet length is preferably 3 to 18 mm, and more preferably 3 to 15 mm.

The pellet diameter is not particularly limited, but ranges from 1 to 5 mm, preferably 2 to 4 mm in view of the productivity and handling of the pellets during the molding process.

The preferable relation between the pellet length (L) and the pellet diameter (D) is represented by the aspect ratio. The preferable L/D ranges from 1 to 6. An L/D of less than 1 results in vertical cracking of the pellet during pelletizing, causing fluffing of the reinforcing natural fiber, and results in difficulty in handling. On the other hand, an L/D larger than 6 not only results in reduced pellet productivity because the pellet is too long and thin, but also results in the breaking of the pellet due to the jamming of pellets in a screw when it is used for injection molding. The reinforcing natural fiber is shortened due to breaking, and the breaking results in a poor mechanical property of the molded product. In view of the above, the preferable L/D ranges from 2 to 5.

The natural fiber used as a reinforcing fiber in the present invention is generally apt to deteriorate thermally from a temperature of approximately 150° C. or higher, though this depends on the type of the natural fiber. Therefore, it is desirable that attention is paid to prevent the thermal deterioration of the natural fiber when thermoplastic resin with a high melting point or softening point is used. A low molten resin temperature is desirable when thermoplastic resin is impregnated in natural fiber, and a suitable temperature should be selected in view of the balance between the penetration of the resin into the natural fiber and the melt viscosity of resin that affects the drawing speed of the strand (fiber-reinforced resin strand impregnated with resin).

When thermoplastic resin is selected, thermoplastic resin with a melt viscosity suitable for impregnation in a natural fiber strand is selected, and the thermoplastic resin is heated to a sufficiently high temperature in the allowable range so that the melt viscosity becomes sufficiently low. Furthermore, the type of thermoplastic resin should be selected in view of the mechanical property of the molded product. For example, in the case of polypropylene resin, the melt flow rate (MFR: 230° C., 2.16 kgf) is in a range from 10 g/10 min to 200 g/10 min, preferably in a range from 20 g/10 min to 150 g/10 min, and more preferably in a range from 30 g/10 min to 100 g/10 min. The molten resin temperature is in a range from 230 to 280° C., preferably in a range from 240 to 260° C., and more preferably in a range from 245 to 255° C.

An MFR of the polypropylene resin smaller than the above-mentioned range results in reduced productivity of pellets that contain natural fiber and results in insufficient impregnation of resin into natural fiber even though the pellets can be manufactured. At that time, natural fiber is released partially from the obtained resin pellet resulting in poor handling, the natural fiber is dispersed insufficiently in the matrix resin when the molded product is manufactured, and the scattering of property becomes significant. On the other hand, an MFR larger than the above-mentioned range results in the disadvantage of poor material performance such as strength, modulus, and heat resistance.

The preferable natural fiber content in thermoplastic resin in accordance with the present invention is 10 to 65% by volume, and more preferably 12 to 60% by volume. If the natural fiber content is smaller than 10% by volume, the absolute quantity of natural fiber is insufficient and the property reinforcing function is exhibited insufficiently. On the other hand, if the natural fiber content is larger than 65% by volume, the impregnation of resin into natural fiber is apt to be insufficient, natural fiber is apt to be released from resin pellets to cause a problem in handling and a problem of bridging at part of a hopper of an injection molding machine. Furthermore, the high natural fiber content causes insufficient dispersion of reinforcing fiber in the molded product and the scattering of property becomes significant.

When resin pellets of the present invention are used as the molding material, a method may be employed, in which composite resin pellets with a high reinforcing fiber content, which is used as the master batch, is dry-blended with resin pellets formed of the same resin as the matrix resin of the composite resin pellets or a different resin compatible with the matrix resin of the composite resin to adjust the reinforcing fiber content to the desired value.

Resin pellets of the present invention are suitably used for manufacturing automobile parts (for example, inner panel), from which a large amount of waste is generated. The automobile parts obtained as described hereinbefore is excellent in strength and is helpful in reducing waste pollution.

EXAMPLE

The present invention will be described in detail hereinafter with reference to examples. However, the present invention is by no means limited to the examples described hereinafter, and may be modified without departing from the spirit and scope thereof, and these modifications are included in the technical scope of the present invention.

Example 100 part by weight of homo-polypropylene resin with a density of 0.91 g/cm$^3$, MFR (230° C., 2.16 kgf) of 60 g/10 min, and with a melting point of 165° C. was blended with 3 parts by weight of maleic anhydride-modified polypropylene resin [product of Sanyo Kasei Kogyo, brand name: Umex 1001] with an acid number of 26 mgKOH/g, density of 0.95 g/cm$^3$, molecular weight of 40,000 (weight average molecular weight by GPC method) to form blended resin pellets.

Spun yarn of jute with No. 3, 7, 15, 36, 60, and 100 counts of the first type D specified in JIS L2401 was used as the natural fiber.

A spun yarn strand was impregnated in a bath containing molten resin formed by melting the above-mentioned resin pellets at 250° C. where the spun yarn strand was twisted under the conditions listed in table 1 and pultruded at a line speed of 15 m/min (resin bath passing time of the spun yarn was about 0.8 seconds). The obtained fiber-reinforced resin was cooled and solidified, and cut into 9 mm lengths. As described hereinbefore, fiber-reinforced resin pellets with a diameter of 3 mm and a length of 9 mm were manufactured, and one-hour continuous production (pultruding of strand) was evaluated. Furthermore, the degree of impregnation of resin into fiber-reinforced resin pellet was evaluated by visual observation, and also the release of fiber from the cross section of each pellet was observed to evaluate the degree of impregnation, and the results are listed in table 1.

[Impregnation of resin]

⊚: there is a non-impregnated portion and the release of fiber from the cross section is not found.

○: there is a non-impregnated portion apparent, but slight release of fiber from the cross section is found.

X: there is a non-impregnated portion apparent, and remarkable release of fiber from the cross section is found.

TABLE 1

| Spun yarn No. count | Number of spun yarns | Twist (turns/m) | Twist direction | 1-hour continuous operation | Resin impregnation | Fiber content (% by weight) | Remarks |
|---|---|---|---|---|---|---|---|
| 36 | 3 | 60 | S twist | OK | ⊚ | 50 | Example 1 |
| 15 | 8 | 60 | Z twist | OK | ⊚ | 55 | Example 2 |
| 60 | 2 | 60 | S twist | OK | ○ | 54 | Example 3 |
| 7 | 17 | 60 | Z twist | OK | ⊚ | 54 | Example 4 |
| 3 | 40 | 60 | Z twist | NG | ⊚ | 55 | Comparative example 1 |
| 100 | 1 | 60 | S twist | OK | X | 46 | Comparative example 2 |
| 15 | 8 | 30 | Z twist | OK | ⊚ | 55 | Example 5 |
| 36 | 3 | 30 | S twist | OK | ⊚ | 50 | Example 6 |
| 100 | 1 | 30 | S twist | OK | X | 46 | Comparative example 3 |
| 36 | 3 | 100 | S twist | OK | ○ | 50 | Example 7 |
| 3 | 40 | 100 | Z twist | NG | ○ | 55 | Comparative example 4 |
| 36 | 3 | 0 | Z twist | NG | X | 50 | Comparative example 5 |
| 100 | 1 | 0 | S twist | NG | X | 46 | Comparative example 6 |
| 15 | 8 | 250 | Z twist | OK | X | 55 | Comparative example 7 |

All the examples listed in Table 1 satisfy the conditions specified in the present invention. The strand was not broken during one-hour of continuous operation, fiber-reinforced resin pellets were manufactured smoothly, and impregnation of resin of the obtained pellets was good. On the other hand, in the comparative examples 1 and 4 in which natural fiber spun yarn with an insufficient yarn number count was used, the strand was broken due to insufficient strength of the spun yarn strand to withstand the impregnating tension and continuous operation was interrupted though impregnation of resin was good. In the comparative examples 2, 3, and 6 in which natural fiber spun yarn with an excessively large yarn number count was used, insufficient impregnation of resin was found.

In the comparative example 5 in which spun yarn with a suitable yarn number count was used, but the spun yarn strand was not twisted during the running of the impregnating process, the strand was broken. On the other hand, when the spun yarn strand was twisted excessively (comparative example 7), insufficient impregnation of resin was clearly found though the stability of running the impregnating process is excellent.

A flat plate with a thickness of 3.2 mm, a width of 100 mm, and a length of 200 mm was manufactured using an injection molding machine (Japan Steel Works, brand name: "JSW J200SA") under a resin temperature of 180° C. and a mold temperature of 50° C. using fiber-reinforced resin pellets obtained in the above-mentioned example 1 as the molding material. The bending property and impact property were tested according to the measurement method described hereinafter and the result listed in table 2 was obtained.

As a reference example, a flat plate of the same size as described hereinbefore was manufactured by a method in which 20% of the glass fiber that had been treated so as to be used suitably for polypropylene resin is mixed with polypropylene resin that is the same as that described hereinbefore served as the matrix resin, the mixed resin material was used to manufacture glass fiber-reinforced polypropylene resin pellets using a kneading extruder, and the resin pellets are used as molding material to manufacture the flat plate. The flat plate was subjected to the same test as applied in Table 1.

(Evaluation Method)
Flexural strength and flexural modulus: JIS K7203
Izod impact value: JIS K7110
Density: JIS K7112

TABLE 2

|  | Example 1 | Reference Example |
|---|---|---|
| Density | 1.06 | 1.04 |
| Flexural strength (Mpa) | 68 | 110 |
| Flexural modulus (Gpa) | 4.9 | 4.1 |
| Izod impact value (notched: kJ/m$^2$) | 6 | 8 |

The present invention has the constitution as described hereinbefore, natural discontinuous fiber, which has attracted attention for use as a reinforcing fiber, is used, fiber-reinforced thermoplastic resin pellets that satisfy the quality stability of molding material (homogeneous impregnation, deterioration prevention of reinforcing fiber) and strength performance of the molded product can be manufactured continuously with excellent productivity.

The foregoing invention has been described in terms of preferred embodiments. However, those skilled, in the art will recognize that many variations of such embodiments exist. Such variations are intended to be within the scope of the present invention and the appended claims.

What is claimed is:

1. Natural fiber-reinforced thermoplastic resin pellets comprising thermoplastic resin and a strand comprising a plurality of spun yarns of natural fiber twisted in a range from 10 to 200 turns/m,
    wherein the spun yarns are No. 5 to 80 counts in diameter.
2. A method for manufacturing natural fiber-reinforced thermoplastic resin pellets comprising steps of:
    an impregnating step for impregnating in a thermoplastic resin bath, a plurality of spun yarns of natural fiber being No. 5 to 80 counts in diameter,
    a pultruding step for pultruding the spun yarns with twisting 10 to 200 turns/m to obtain natural fiber-reinforced thermoplastic resin, and a pelletizing step for pelletizing the natural fiber-reinforced thermoplastic resin.

3. A natural fiber-reinforced thermoplastic resin-made automobile part prepared from a composite comprising natural fiber-reinforced thermoplastic resin pellets comprising thermoplastic resin and a strand comprising a plurality of spun yarns of natural fiber twisted in a range from 10 to 200 turns/m, wherein the spun yarns are No. 5 to 80 counts in diameter.

4. The pellets according to claim 1, wherein the fiber is at least one selected from the group consisting of flax, ramie, abaca, sisal, jute, hemp, kenaf, Boehimeria nipponivea fiber, Japanese ramie, coir, cotton, kapok, hemp palm, rice straw, wheat straw, pineapple fiber, wool, and silk.

5. The pellets according to claim 1, wherein the spun yarns are No. 7 to 80 count.

6. The pellets according to claim 5, wherein the spun yarns are No. 10 to 40 count.

7. The pellets according to claim 1, wherein the plurality of spun yarns are twisted in a range of from 15 to 150 turns/m.

8. The pellets according to claim 7, wherein the plurality of spun yarns are twisted in a range of from 20 to 120 turns/m.

9. The pellets according to claim 1, wherein Z-twisting is employed for the spun yarns of natural fiber.

10. The pellets according to claim 9, wherein the spun yarns are No. 5 to 20 counts in diameter.

11. The pellets according to claim 1, wherein S-twisting is employed for the spun yarns of natural fiber.

12. The pellets according to claim 11, wherein the spun yarns are No. 21 to 80 counts in diameter.

13. The pellets according to claim 1, wherein the thermoplastic resin is at least one selected from the group consisting of polyolefin resins, polyamide resins, polyester resins, polycarbonate resins, polystyrene resins, acrylic resins, AS resins, ABS resins, PPS resins and POM resins.

14. The pellets according to claim 13, wherein the thermoplastic resin is at least one selected from the group consisting of polypropylene, high density polyethylene, linear low density polyethylene, low density polyethylene, polymers and copolymers of α-olefins, polyolefin resins modified with an unsaturated carboxylic acid or derivatives thereof, and ethylene-vinyl acetate resins.

15. The pellets according to claim 1, wherein the pellet has a length of 2 to 24 mm and a diameter of 1 to 5 mm.

16. The pellets according to claim 15, wherein the pellet length is 3 to 15 mm and the pellet diameter is 2 to 4 mm.

17. The pellets according to claim 1, wherein the aspect ratio of pellet length to pellet diameter ranges from 1 to 6.

18. The pellets according to claim 17, wherein the aspect ratio of pellet length to pellet diameter ranges from 2 to 5.

19. The pellets according to claim 1, wherein the natural fiber content is 10 to 65% by volume.

20. The pellets according to claim 19, wherein the natural fiber content is 12 to 60% by volume.

21. The pellets according to claim 1, wherein the natural fiber is discontinuous.

22. The pellets according to claim 1, wherein said plurality of spun yarns has a fixed length longer than a length of the pellet.

* * * * *